US010863429B2

(12) United States Patent
Hietalahti et al.

(10) Patent No.: US 10,863,429 B2
(45) Date of Patent: Dec. 8, 2020

(54) METHOD AND APPARATUS FOR MANAGING ACCESS INFORMATION IN A TRANSITIONAL NETWORK ENVIRONMENT

(71) Applicant: NOKIA TECHNOLOGIES OY, Espoo (FI)

(72) Inventors: Hannu Hietalahti, Kiviniemi (FI); Samuli Turtinen, Ii (FI); Antti Toskala, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/319,978

(22) PCT Filed: Aug. 12, 2016

(86) PCT No.: PCT/IB2016/054871
§ 371 (c)(1),
(2) Date: Jan. 23, 2019

(87) PCT Pub. No.: WO2018/029513
PCT Pub. Date: Feb. 15, 2018

(65) Prior Publication Data
US 2019/0274097 A1 Sep. 5, 2019

(51) Int. Cl.
H04M 3/00 (2006.01)
H04W 48/18 (2009.01)
(Continued)

(52) U.S. Cl.
CPC .......... H04W 48/18 (2013.01); H04W 8/245 (2013.01); H04W 48/08 (2013.01); H04W 48/12 (2013.01);
(Continued)

(58) Field of Classification Search
CPC . H04W 48/18; H04W 48/12; H04W 52/0212; H04W 48/08; H04W 8/245;
(Continued)

(56) References Cited

U.S. PATENT DOCUMENTS 9,179,499 B1  11/2015 Fang et al.
9,338,700 B2   5/2016 Schulist et al.
(Continued)

FOREIGN PATENT DOCUMENTS

EP      2 996 394 A1    3/2016
WO   WO 2015/037820 A1  3/2015
(Continued)

OTHER PUBLICATIONS

International Search Report and Written Opinion for Application No. PCT/IB2016/054871 dated Apr. 6, 2017, 11 pages.
(Continued)

Primary Examiner — Marcos Batista
(74) Attorney, Agent, or Firm — Alston & Bird LLP

(57) ABSTRACT

A method, apparatus and computer program product are provided to manage and use access information in a transitional and/or multigenerational network environment. In some example implementations, an indication associated with the availability of services associated with a second network is received during the performance of procedures associated with a layer of a first network. Based at least in part on the indication associated with the availability of second network services in the location associated with a mobile device, a control signal is generated causing a reconfiguration of a mobile device. Some example embodiments arise in the context of the fifth generation (5G) networks deployed alongside Long Term Evolution (LTE)
(Continued)

networks, such that the mobile device can be reconfigured based at least in part on the availability or unavailability of 5G service.

21 Claims, 3 Drawing Sheets

(51) Int. Cl.
*H04W 8/24* (2009.01)
*H04W 48/08* (2009.01)
*H04W 52/02* (2009.01)
*H04W 48/12* (2009.01)
*H04W 88/06* (2009.01)

(52) U.S. Cl.
CPC ........ *H04W 52/0212* (2013.01); *H04W 52/02* (2013.01); *H04W 88/06* (2013.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/1264* (2018.01); *Y02D 70/142* (2018.01); *Y02D 70/164* (2018.01)

(58) Field of Classification Search
CPC .... H04W 88/06; H04W 52/02; Y02D 70/164; Y02D 70/12; Y02D 70/142; Y02D 70/1264; Y02D 70/1242; Y02D 70/126; Y02D 70/10; Y02D 70/1262

USPC .......................................... 455/419; 370/338
See application file for complete search history.

(56) References Cited

U.S. PATENT DOCUMENTS

| | | |
|---|---|---|
| 2007/0224988 A1 | 9/2007 | Shaheen |
| 2009/0104907 A1 | 4/2009 | Otting et al. |
| 2015/0304922 A1 | 10/2015 | Baboescu et al. |
| 2016/0183174 A1* | 6/2016 | Xie ........................ H04W 48/18 455/436 |
| 2017/0118689 A1 | 4/2017 | Zhang et al. |
| 2017/0245316 A1* | 8/2017 | Salkintzis ............. H04W 48/16 |

FOREIGN PATENT DOCUMENTS

| | | |
|---|---|---|
| WO | WO 2015/156492 A1 | 10/2015 |
| WO | WO 2016/000313 A1 | 1/2016 |

OTHER PUBLICATIONS

Capone, A. et al., *Context Information for Fast Cell Discovery in mm-wave 5G Networks* [online] [retrieved Apr. 2, 2019]. Retrieved from the Internet: <URL: https://axiv.org/pdf/1501.02223.pdf>, (dated May 18, 2016) 6 pages.

* cited by examiner

METHOD AND APPARATUS FOR MANAGING ACCESS INFORMATION IN A TRANSITIONAL NETWORK ENVIRONMENT

CROSS-REFERENCE TO RELATED APPLICATIONS

This application is a national phase entry of International Application No. PCT/IB2016/054871, filed Aug. 12, 2016, the entire contents of which are incorporated herein by reference.

TECHNICAL FIELD

An example embodiment relates generally to wireless network access technology, particularly in the context of managing access and use of networks that incorporate components, protocols, and other aspects associated with multiple generations of wireless network technology.

BACKGROUND

Mobile devices have become an essential tool used by individuals to communicate with one another, access information, entertain themselves, and otherwise improve many facets of their lives. Improvements in the capabilities of mobile devices, the expansions of the coverage areas of the networks with which mobile devices interact, and increases in the degree to which people rely on their mobile devices have converged to create situations where large numbers of people expect ubiquitous, robust network connectivity. To meet these needs and expectations, service providers and other entities have sought to develop and implement improved wireless networks, including Fifth Generation, or 5G, networks.

As with other large-scale infrastructure improvement projects, the construction, deployment, installation, and implementation of 5G networks and their related infrastructure is likely to involve many participants and occur in a phased manner, at least in the sense that 5G network services may become available in some geographic areas before they become available in others. Consequently, users of mobile devices will likely experience situations where they and their mobile device move through areas that offer network environments that involve different and/or multiple generations of network technology. At the same time, users of mobile devices may be sensitive to service disruptions and/or perceived performance issues with their mobile device in such network environments.

BRIEF SUMMARY

A method, apparatus and computer program product are therefore provided in accordance with an example embodiment in order to manage and use access information in a transitional and/or multigenerational network environment. In this regard, the method, apparatus and computer program product of an example embodiment provide for the detection of the availability of network services associated with a particular generation, such as 5G network services, and reconfiguring a mobile device to perform in that network environment.

In an example embodiment, a method is provided that includes performing a set of procedures associated with a layer of a first network. The method of this example embodiment also includes, while performing the set of procedures associated with the layer of the first network, receiving an indication associated with the availability of services associated with a second network in a location associated with the mobile device. The method of this example embodiment also includes, based at least in part on receiving the indication associated with the availability of services associated with the second network in the location associated with the mobile device, generating a control signal causing a reconfiguration of the mobile device.

In some example implementations of such a method, the first network conforms to a Long Term Evolution (LTE) standard and the second network conforms to a fifth generation (5G) standard. In some example implementations of such methods, the layer of the network is an access stratum layer of the network. In some example implementations of such a method, the layer of the network is a non-access stratum layer of the network.

In some example implementations, the indication associated with the availability of services associated with the second network in the location associated with the mobile device is received from a public land mobile network. In some such example implementations, the reconfiguration of the mobile device comprises causing the mobile device to be configured to use 5G resources in a predetermined area. In some example implementations, and in other example implementations, the reconfiguration of the mobile device comprises causing the mobile device to be configured to limit use of a battery associated with the mobile device when the mobile device is located outside a predetermined area.

Some example implementations of such a method further include determining, based at least in part on the indication associated with the availability of services associated with a second network in the location associated with the mobile device, that 5G services are available in the location associated with the mobile device; and causing a modem associated with the mobile device to search for a 5G synchronization signal. In some such example implementations and in other example implementations, the indication further comprises an indication associated with a frame synchronization status of 5G services and LTE (long-term evolution) services available in the location associated with the mobile device.

Some example implementations of such a method further include determining, based at least in part on the indication associated with the range of the LTE ID values detected for the LTE physical cell ID (PCI) and/or LTE global cell ID, with such determination that either pre-determined range of IDs causes search for 5G cells or alternatively a previously visited cell LTE Cell ID, with 5G cell availability detected, causes UE to activate the 5G search function. In such a case also potential power saving operation on 5G side would be dropped or reduced in order to rapidly find the 5G cell in the area. Alternatively, presence of such LTE IDs that 5G has not been detected earlier, causes the UE to use power saving mode and search for 5G more seldom only.

In some such example implementations, and in other example implementations, a method further includes determining whether the mobile device has previously detected a 5G synchronization signal in the location associated with the mobile device; and applying a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device. In some such example implementations, and in other example implementations, applying a first set of search criteria or a second set of search criteria further comprises determining the frame synchronization status of 5G services and LTE services available in the location associated with the mobile device.

In another example embodiment, an apparatus is provided that includes at least one processor and at least one memory that includes computer program code with the at least one memory and the computer program code configured to, with the at least one processor, cause the apparatus to at least perform a set of procedures associated with a layer of a first network; while performing the set of procedures associated with the layer of the first network, receive an indication associated with the availability of services associated with a second network in a location associated with a mobile device; and based at least in part on receiving the indication associated with the availability of services associated with the second network in the location associated with the mobile device, generate a control signal causing a reconfiguration of the mobile device.

In some example implementations, the first network conforms to an LTE standard and the second network conforms to a 5G standard. In some example implementations, the layer of the network is an access stratum layer of the network. In some such example implementations, and in other example implementations, the layer of the network is a non-access stratum layer of the network. In some example implementations the indication associated with the availability of services associated with the second network in the location associated with the mobile device is received from a public land mobile network.

In some such example implementations and in other example implementations, the reconfiguration of the mobile device comprises causing the mobile device to be configured to use 5G resources in a predetermined area. In some such example implementations and in other example implementations, the reconfiguration of the mobile device comprises causing the mobile device to be configured to limit use of a battery associated with the mobile device when the mobile device is located outside a predetermined area.

In some example implementations, the at least one memory and the computer program code are further configured to, with the processor, cause the apparatus to at least determine, based at least in part on the indication associated with the availability of services associated with the second network in the location associated with the mobile device, that 5G services are available in the location associated with the mobile device; and cause a modem associated with the mobile device to search for a 5G synchronization signal. In some such example implementations, and in other example implementations, the indication further comprises an indication associated with a frame synchronization status of 5G services and LTE services available in the location associated with the mobile device.

In some example implementations of such an apparatus, the at least one memory and the computer program code are further configured to, with the processor, cause the apparatus to at least determine, based at least in part on the indication associated with the range of the LTE ID values detected for the LTE physical cell ID (PCI) or/and LTE global cell ID, with such determination that either pre-determined range of IDs causes search for 5G cells or alternatively a previously visited cell LTE Cell ID, with 5G cell availability detected, causes UE to activate the 5G search function. In such a case also potential power saving operation on 5G side would be dropped or reduced in order to rapidly to find the 5G cell in the area. Alternatively presence of such LTE IDs that 5G has not been detected earlier, causes the UE to use power saving mode and search for 5G more seldom only.

In some example implementations, the at least one memory and the computer program code are further configured to, with the processor, cause the apparatus to at least determine whether the mobile device has previously detected a 5G synchronization signal in the location associated with the mobile device; and apply a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device. In some such example implementations, applying a first set of search criteria or a second set of search criteria further comprises determining the frame synchronization status of 5G services and LTE services available in the location associated with the mobile device.

In a further example embodiment, a computer program product is provided that includes at least one non-transitory computer-readable storage medium having computer-executable program code instructions stored therein with the computer-executable program code instructions including program code instructions configured to perform a set of procedures associated with layer of a first network; while performing the set of procedures associated with the layer of the first network, receive an indication associated with the availability of services associated with a second network in a location associated with a mobile device; and based at least in part on receiving the indication associated with the availability of services associated with the second network in the location associated with the mobile device, generate a control signal causing a reconfiguration of the mobile device.

In some example implementations, the first network conforms to an LTE standard and the second network conforms to a fifth generation (5G) standard. In some example implementations, the layer of the network is an access stratum layer of the network. In some example implementations, the layer of the network is a non-access stratum layer of the network. In some such example implementations, and in other example implementations, the indication associated with the availability of services associated with the second network in the location associated with the mobile device is received from a public land mobile network.

In some example implementations, the reconfiguration of the mobile device comprises causing the mobile device to be configured to use 5G resources in a predetermined area. In some such example implementations, and in other example implementations, the reconfiguration of the mobile device comprises causing the mobile device to be configured to limit use of a battery associated with the mobile device when the mobile device is located outside a predetermined area.

In some example implementations, the computer-executable program code instructions comprising program code instructions are further configured to: determine, based at least in part on the indication associated with the availability of services associated with the second network in the location associated with the mobile device, that 5G services are available in the location associated with the mobile device; and cause a modem associated with the mobile device to search for a 5G synchronization signal. In some such example implementations, and in other example implementations, the indication further comprises an indication associated with a frame synchronization status of 5G services and LTE services available in the location associated with the mobile device.

In some example implementations, the computer-executable program code instructions comprising program code instructions are further configured to: determine, based at least in part on the indication associated with the range of the LTE ID values detected for the LTE physical cell ID (PCI) or/and LTE global cell ID, with such determination that either pre-determined range of IDs causes search for 5G cells or alternatively a previously visited cell LTE Cell ID, with 5G cell availability detected, causes UE to activate the 5G search function. In such a case also potential power saving operation on 5G side would be dropped or reduced in order to rapidly to find the 5G cell in the area. Alternatively presence of such LTE IDs that 5G has not been detected earlier, causes the UE to use power saving mode and search for 5G more seldom only.

In some example implementations, the computer-executable program code instructions comprising program code instructions are further configured to: determine whether the mobile device has previously detected a 5G synchronization signal in the location associated with the mobile device; and apply a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device. In some such example implementations, applying a first set of search criteria or a second set of search criteria further comprises determining the frame synchronization status of 5G services and LTE services available in the location associated with the mobile device.

In yet another example embodiment, an apparatus is provided that includes means for performing a set of procedures associated with a layer of a first network; while performing the set of procedures associated with the layer of the first network, receiving an indication associated with the availability of services associated with a second network in a location associated with the mobile device; and based at least in part on receiving the indication associated with the availability of services associated with the second network in the location associated with the mobile device, generating a control signal causing a reconfiguration of the mobile device.

In some example implementations, the first network conforms to an LTE standard and the second network conforms to a 5G standard. In some example implementations, the layer of the network is an access stratum layer of the network. In some example implementations, the layer of the network is a non-access stratum layer of the network.

In some such example implementations and in other example implementations, the indication associated with the availability of services associated with the second network in the location associated with the mobile device is received from a public land mobile network. In some such example implementations and in other example implementations, the reconfiguration of the mobile device comprises causing the mobile device to be configured to use 5G resources in a predetermined area. In some example implementations, and in other example implementations, the reconfiguration of the mobile device comprises causing the mobile device to be configured to limit use of a battery associated with the mobile device when the mobile device is located outside a predetermined area.

In some example implementations, the apparatus further includes means for determining, based at least in part on the indication associated with the availability of services associated with the second network in the location associated with the mobile device, that 5G services are available in the location associated with the mobile device; and causing a modem associated with the mobile device to search for a 5G synchronization signal. In some such example implementations and in other example implementations, the indication further comprises an indication associated with a frame synchronization status of 5G services and LTE services available in the location associated with the mobile device.

In some example implementations, the apparatus further includes means for determining whether the mobile device has previously detected a 5G synchronization signal in the location associated with the mobile device; and applying a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device. In some such example implementations, and in other example implementations, applying a first set of search criteria or a second set of search criteria further comprises determining the frame synchronization status of 5G services and LTE services available in the location associated with the mobile device.

BRIEF DESCRIPTION OF THE DRAWINGS

Figure 1:
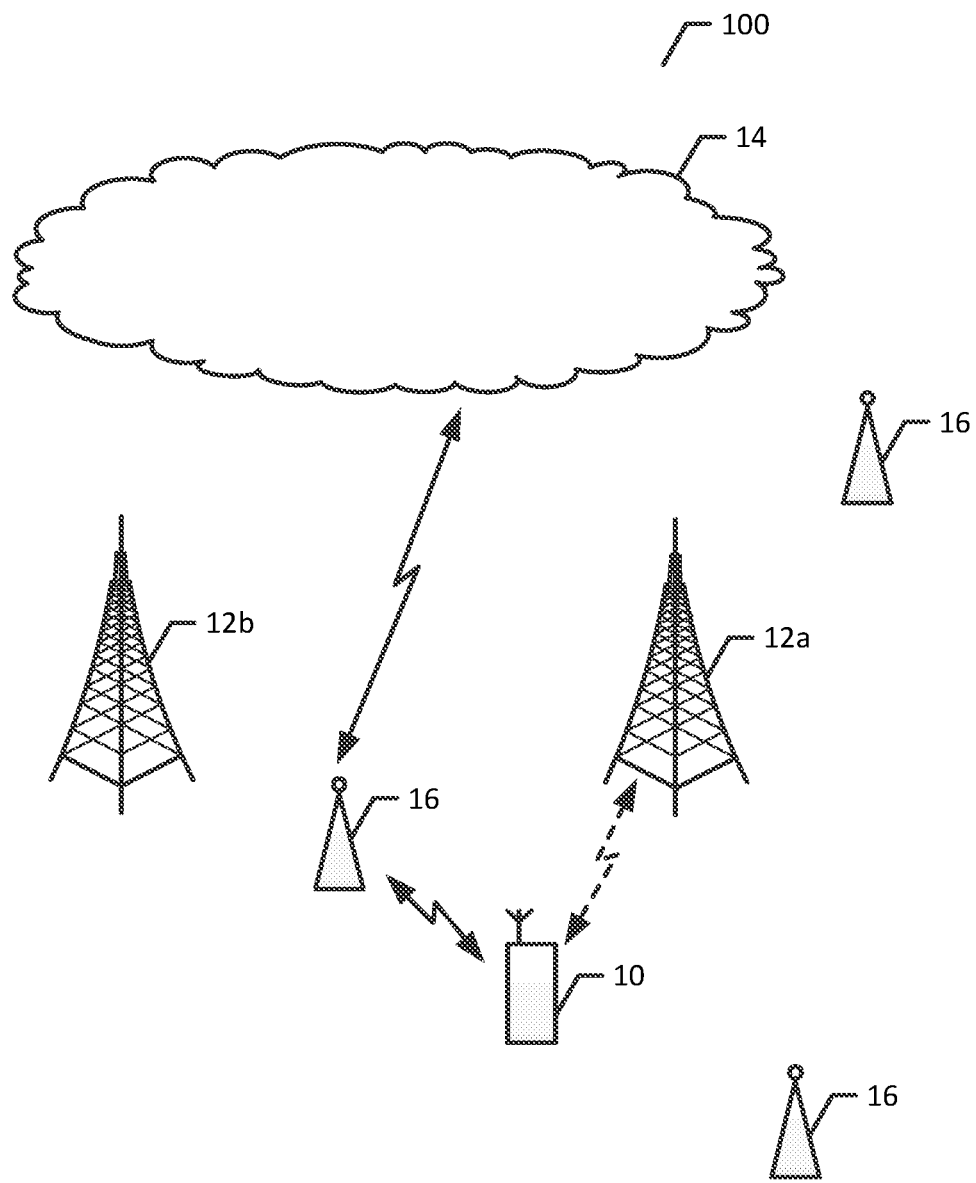
Figure 2:
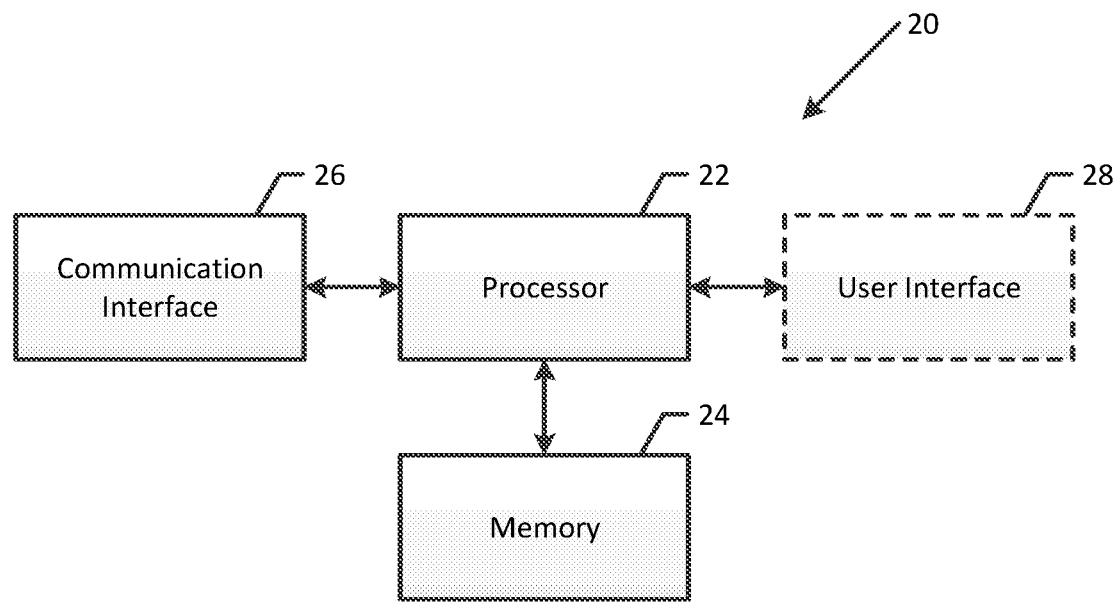
Figure 3:
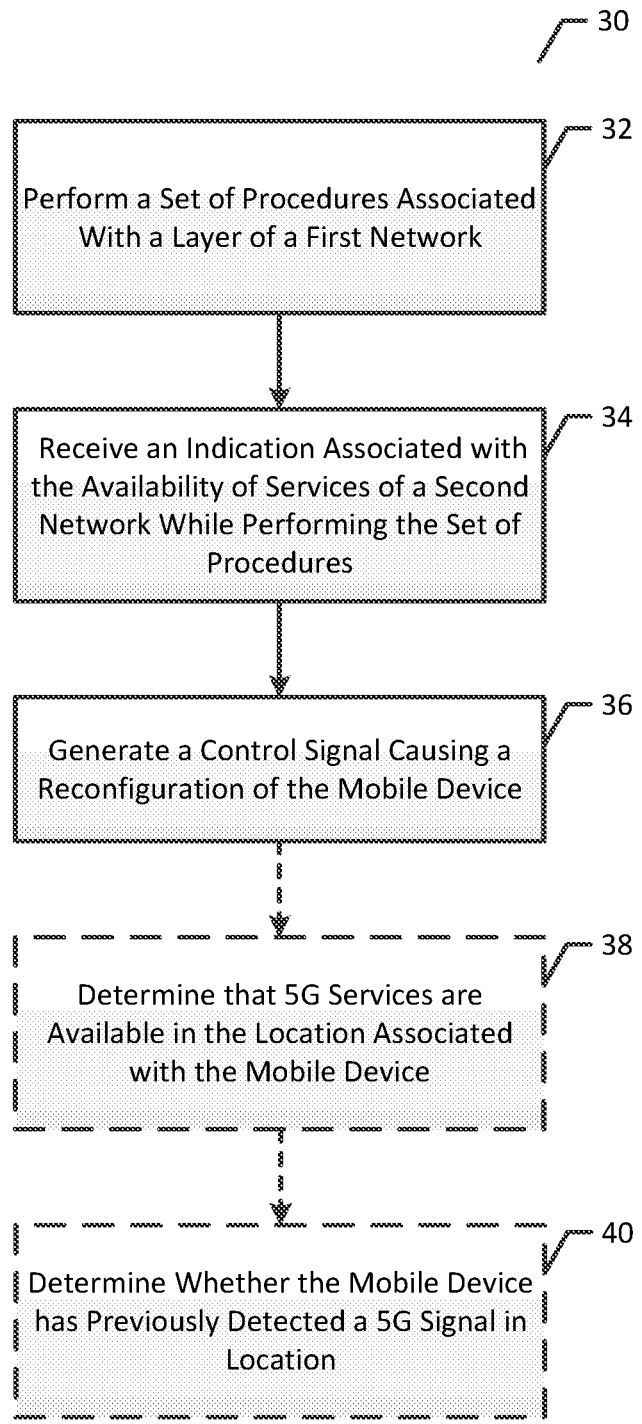

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention; and FIG. 3 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention.

Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to manage and use access information in a transitional and/or multigenerational network environment, such as network environments that include legacy network infrastructure and service, current-generation network infrastructure and service, and/or next-generation network infrastructure and service. Many of the example embodiments and implementations described or otherwise contemplated herein arise in the context of a network environment that includes future 5G radio access technology, including but not limited to environments where 5G radio access technology is present alongside other network access technology. As such, many such example embodiments and implementations also contemplate and are applicable to other technologies, such as LTE-A (Long Term Evolution Advanced) evolution. However, it will be appreciated that example embodiments and implementations may be directed to network environments that include networks conforming to other standards, and need not necessarily include networks conforming to LTE or 5G standards.

It is expected that LTE-based systems and/or other network environments conforming to LTE standards will continue to be important sources of connectivity for User Equipment (UE) and other mobile devices, particularly during the early trials and deployments of 5G technology, as well as at other times throughout the duration of the 5G era. LTE systems have been widely deployed, and provide adequate coverage and performance for many current mobile device needs, particularly with regards to system reliability, mobility anchoring, and core network connectivity for UEs. As such, it is likely that 5G systems will often be deployed alongside LTE systems. However, in many such contexts, the coverage area associated with the 5G systems will not be precisely congruent with the coverage areas associated with the LTE systems, such that a user may unknowingly move into and out of areas in which 5G coverage is available. Consequently, and particularly in the context of standards-setting, considerations of LTE-5G interworking are of high importance.

One of the technical challenges associated with approaches to effecting the interworking of systems conforming to different generations of wireless network protocols resides to the changes that are often required to be made to aspects of the legacy system (such as the LTE system in an LTE-5G interworking context). Particularly in situations where operators prefer to use the existing installed legacy system base, changes to a legacy system and/or its related infrastructure tend to complicate inter-vendor solutions where a legacy system is provided by a different vendor from the vendor providing the new system. For example, in some areas, an LTE system may be provided by one vendor while a 5G system is provided by a second vendor who is unrelated to the first vendor. Moreover, in some situations, an operator and/or vendor might be reluctant to invest the resources necessary to updating all of its existing LTE base stations to implement a working 5G system in a certain area. Consequently, there is a need (and preference amongst operators) for interworking solutions that exhibit minimal or no impact to a legacy system.

At least some of the example embodiments and implementations contemplated and discussed herein are aimed at meeting the need for interworking solutions associated with the installation and deployment of 5G system infrastructure in environments with existing LTE service. Particularly during the early stages of 5G system deployment, it is unlikely that a user will experience continuous 5G coverage at all times. This lack of continuous 5G coverage will result in a need to rely on LTE coverage available in areas where 5G coverage is unavailable.

In some such situations, one potential early solution implicates 3GPP (Third Generation Partnership Project) technology with dual connectivity. Other potential solutions that may be used in connection with 5G rely on the use of an X2-like interface between an LTE eNB (eNodeB, or Evolved Node B) and a 5G Node. Such potential solutions also require the use of additional PLMN codes to indicate which cells would and/or could provide 5G service, which could be accomplished as a configuration modification to one or more existing LTE eNodeBs.

However, each of these potential solutions have several drawbacks. For example, an interface between an LTE and 5G BTS (base transceiver station) may not be available. Moreover, solutions requiring additional PLMN (public land mobile network) ID (identification) codes are not likely to become accepted as a common 3GPP solution to meet the requirements of all operators. Further, in some situations, the need for an additional PLMN ID might cause substantial licensing costs to be incurred. Regardless of the financial cost, the use of an additional PLMN ID will also cause additional administrative overhead. Moreover in some potential solutions that involve providing an indication of 5G availability in an area via NAS (non-access stratum) or AS (access stratum), additional technical challenges arise, particularly with respect to optimization of the power consumption by a UE if the UE is required to perform a continuous search for 5G connectivity. Moreover, if the LTE network is not aware of the 5G network, such as may be the case in contexts where the LTE network and the 5G network are provided by different, unrelated entities in a given area, it is unlikely that the LTE network itself will be able to provide guidance to a UE regarding when to search for a 5G network or not. In contexts that cannot rely on an LTE eNB steering a 5G capable UE towards 5G cells, or sharing broadcast information on 5G availability, it will be both slower and more energy consuming for the UE to find 5G service, where available. However, and as contemplated by many of the example embodiments and implementations described herein, if the UE or other mobile device could be made aware of the possible and/or likely existence of 5G service in the service area of some selected LTE areas, then a 5G capable UE could seek to use the available 5G resources more efficiently.

It will be appreciated that 3GPP has specified several methods to aid the UE selection of another cell, another RAT (radio access technology) or another PLMN. 3GPP TS 23.122 (which is incorporated herein by reference) specifies the PLMN and RAT selection based on USIM (universal subscriber identity module) configuration (3GPP TS 31.102, also incorporated herein by reference) where prioritized PLMN and RAT combinations can be configured by an HPLMN (home public land mobile network) operator. 3GPP TS 23.402, 24.302, 24.312 and 31.102 (each of which are incorporated herein by reference) also specify several methods for WLAN (wireless local area network) selection by one or more UEs based on guidance given over 3GPP specified UE pre-configuration or so called RAN (radio access network) Rules specified in 3GPP TS 36.300 and 36.331 (both of which are incorporated herein by reference).

These legacy approaches all have drawbacks, particularly in the context of 5G/LTE interworking. For example, each of these methods are either based on UEs subscription related priorities set by the (H)PLMN operator, or otherwise require legacy RAN support, very active scanning by the UE, or both. Implementations of these approaches in LTE rely on the use of neighbor list between 3G and LTE, which necessarily requires changes in the software both in the LTE side and 3G side, but there is no dual connectivity between 3G and LTE. Moreover, LTE/3G interworking (based on handovers only) requires a connection between base stations, and the inside LTE dual connectivity approach relies on the single vendor environment. While some WLAN search methods have been enhanced in the past with a so-called Offload Preference Indicator (OPI), which has also been specified in 3GPP specifications and shown in U.S. Patent Application Publication No. 2015304922 (which is incorporated herein by reference), these approaches do not solve the technical challenges posed by interworking and/or other network access and usages challenges posed by the deployment of 5G networks alongside LTE and other legacy networks.

Many of the example embodiments and implementations described and otherwise contemplated herein address the technical challenges associated with deploying 5G networks, including the challenges associated with interworking in transitional and/or multigenerational environments that involve 5G and LTE network technologies. In some such embodiments, during AS or NAS procedures, the serving PLMN makes the UE aware of availability of 5G service in the current UE location. Based on this indication, the UE can prepare to use 5G resources in the indicated area. Outside of the indicated area, the UE can instead save battery power, such as by avoiding continuous scanning for 5G networks, and/or otherwise attempting to use 5G capabilities in areas where no 5G network connectivity is available.

Some examples are configured such that there is first indication (either via AS RRC (range radio control) or NAS signaling, for example) of 5G service being available in a particular area/cell that is also providing LTE. In some such examples, upon receipt of the first indication, the 5G portions of a UE modem will search for 5G synchronization signals (such as LTE SSS/PSS (secondary synchronization signals/primary synchronization signals) equivalent signals, for example). In addition to identifying the presence of 5G coverage in a particular area, some example implementations contemplate that the indication from the AS or NAS signaling will indicate if the 5G system and LTE system are frame-synchronized or not.

In some implementations, the requirements and/or parameters associated with the search performed by the UE are set in a way such that once a 5G cell is found within a particular LTE cell (such as with the particular global cell ID or combination of tracking area IE (information element)+ physical cell IE, for example), the requirements for finding 5G in that particular cell areas are tighter and/or more restrictive compared to instances where a 5G has not been detected. In some implementations, the requirements and/or parameters associated with the search performed by the UE may additionally vary depending on whether the cells (such as the overlapping 5G and LTE cells, for example) are frame-synchronized and/or otherwise exhibit timing synch. For example, if a UE is seeking to detect 5G synchronization signals and/or other signals associated with 5G availability in a particular cell or location and has not previously detected 5G availability or 5G signals above a particular threshold level in a given area or cell, the search requirements and/or parameters could be set such that the UE is required to detect 5G service within one (1) second in order to permit the UE to operate in a manner that uses 5G connectivity. In such an example, the search requirements and/or parameters may be set at only 250 milliseconds, for example, if the 5G availability has been previously detected in the cell.

Regardless of the search requirements and/or parameters used, upon detection of a 5G cell, the UE may establish the RRC connection, and the 5G RRC would then provide instruction how to access the 5G cell (e.g., RACH (random access channel) parameters, for example). While many of the example implementations discussed and contemplated herein are directed to the use of AS-based and/or NAS-based information provided by a serving PLMN, it will be appreciated that example implementations may use other approaches to encoding information, including the use of other layers or protocols Example implementations of the embodiments disclosed herein exhibit numerous potential advantages. For example, implementations that rely on NAS independent of a particular LTE system would allow the use of a UE, such as a Nokia 5G capable mobile device, in connection with a 5G network provided by a vendor that was unrelated to a vendor providing LTE services in a particular area while still enabling UE power optimization when considering one or more UE operation rules based on an LTE eNodeB global cell ID. In some such implementations, the 5G RRC may be provided as IP connection to the UE via the core.

Another potential advantage involves power savings by the UE. For example, some implementations contemplate a UE running a search for 5G signals less often in a cell where 5G has not been detected earlier, thus avoiding the power usage associated with continuous and/or frequent searches for 5G network connectivity that may be completely unavailable in a particular location. It will be appreciated that such power-saving behavior could be tested as part of one or more 5GPP (fifth generation partnership project) test cases, and may be particularly applicable where, for example, the UE received the related signaling involving the availability of 5G coverage from the networks (such as via NAS or AS, for example). In situations where a user desires to benefit from power saving by the UE, then the resulting behavior of the UE would be discernable depending on whether the 5G signals appear or not during the first time a UE enters a given LTE cell (or group of cells).

In some example implementations, 5G cells may be provided in Tracking Areas of their own. In such example implementations, an MME (mobility management entity) could inform the UE of the availability of 5G service in one or more certain tracking areas. This indication could be given during a TA (tracking area) update procedure, for example, particularly if the MME recognizes that the UE is initiating its Tracking Area Updating in an LTE cell which belongs to a Tracking Area that is either adjacent or overlapping with the 5G service area that is known to the MME.

In some example implementations in the context of an area where 5G service is provided, the indication of the availability of 5G service could take the form of an enhanced existing IE, such as a TAI (tracking area identity) list (for example, as set out in 3GPP TS 24.302, clause 8.2.26, which is incorporated herein by reference) or through the addition of a new IE to indicate particular 4G TAs that are overlapping or adjacent to 5G Tracking Areas. Such new information could then be passed, for example, to a UE by the MME in TRACKING AREA UPDATE ACCEPT message, as specified in 3GPP TS 24.301 clause 8.2.26 (which is incorporated herein by reference). In examples where a UE receives the indication of the availability of 3G service from the serving CN (core network) node, the UE could prepare to use 5G resources without any guidance from the 4G radio network guidance or other implications involving a 4G radio network.

In some example implementations where the indication that 5G service is available is provided at the AS level, the information associated with the indication could, for example, be put in one of the existing system information blocks (SIB), such as SIB1 or SIB2. Moreover, one of the benefits of implementations involving a CN-based mechanism is the potential for invisibility to the 4G radio network, which can enable an operator to provide assistance information to one or more 5G-capable UEs via an existing LTE RAN installed base without requiring an update to the eNBs with the feature. In some such implementations, a corresponding CN update would involve many fewer entries.

While the method, apparatus and computer program product of an example embodiment may be deployed in a variety of different systems, one example of a system that may benefit from the management and use of access information in a transitional and/or multigenerational network environment, including but not limited to the interworking of legacy and/or current generation networks with 5G and/or other next-generation networks in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 10 configured to communicate wirelessly, such as via an access network, with a network 14. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 12a and 12b, such as base stations, e.g., node Bs, evolved Node Bs (eNB), or the like. A cellular access point, such as a base station, may define and service one or more cells. The access points may, in turn, be in communication with a network 14, such as a core network via a gateway, such that the access points establish cellular radio access networks by which the user equipment 10 may communicate with the network. The system environment 100 of FIG. 1 may include a plurality of different cellular radio access networks including, for example, a 5G radio access network, an LTE radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 12a and 12b.

In some implementations of system environment 100, the cellular radio access networks serviced by access points 12a, 12b, and any other access points in a given area are identical, in the sense that as user equipment 10 moves from an area serviced by access point 12a to an area serviced by access point 12b, the user equipment 10 is able to access the network 14 via a radio access network provided by the same vendor an in accordance with the same generation of network access technology across access points. However, in some implementations, including but not limited to implementations that arise during the installation and deployment of new cellular radio access networks, such as 5G cellular radio access networks, for example, the cellular radio access networks available at one access point (access point 12a, for example) may differ from those available at another access point (access point 12b, for example).

Although not shown, the system may also include a controller associated with one or more of the cellular access points, e.g., base stations, so as to facilitate operation of the access points and management of the user equipment 10 in communication therewith. As shown in FIG. 1, a system may also include one or more wireless local area networks (WLANs), each of which may be serviced by a WLAN access point 16 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

Based upon the receipt of an indication of the availability of 5G services in a location associated with a mobile device, such as user equipment, control signal causing a reconfiguration of the mobile device may be generated. In this regard, the management and use of access information in a transitional and/or multigenerational network environment can be accomplished by an apparatus 20 as depicted in FIG. 2. The apparatus may be embodied by and/or incorporated into one or more UEs, such as user equipment 10, or any of the other devices discussed with respect to FIG. 1, such as access points 12a and/or 12b, one or more of WLAN access points 16, and/or devices that may be incorporated or otherwise associated with system environment 100. Alternatively, the apparatus 20 may be embodied by another device, external to such devices. For example, the apparatus may be embodied by a computing device, such as a personal computer, a computer workstation, a server or the like, or by any of various mobile computing devices, such as a mobile terminal, e.g., a smartphone, a tablet computer, etc.

Regardless of the manner in which the apparatus 20 is embodied, the apparatus of an example embodiment is configured to include or otherwise be in communication with a processor 22 and a memory device 24 and optionally the user interface 26 and/or a communication interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 20 may optionally include a user interface 26 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

The apparatus 20 may optionally also include the communication interface 28. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, the operations performed by the apparatus 20 of FIG. 2 in accordance with an example embodiment of the present invention are depicted as an example process flow 30. In this regard, the apparatus includes means, such as the processor 22, the memory 24, the communication interface 26 or the like, for performing a set of procedures associated with a layer of a first network; while performing the set of procedures associated with the layer of the network, receiving an indication associated with the availability of services associated with a second network in a location associated with a mobile device; and based at least in part on receiving the indication associated with the availability of services associated with the second network in the location associated with the mobile device, generating a control signal causing a reconfiguration of the mobile device. As such, the apparatus is generally capable of managing and using access information in transitional and/or multigenerational networking environments and implement interworking solutions between networks configured in accordance with protocols from different generations of technology as discussed and otherwise contemplated herein.

The apparatus includes means, such as the processor 22, the memory 24, the communication interface 26 or the like, for performing a set of procedures associated with a layer of a first network. For example, and with reference to block 32 of FIG. 3, the process 30 includes the performance of a set of procedures associated with a layer of a first network. In a cellular radio access network, including but not limited to LTE networks and/or other 4G (fourth generation) networks, a protocol stack and/or protocol suite may be divided into one or more functional layers, one or more of which may have a set of procedures that are performed when a mobile device or other UE interacts with the cellular radio access networks. In some example implementations, the layer of the network is an access stratum layer of the network. In other example implementations, the layer of the network is a non-access stratum layer of the network. A broad range of procedures may be performed in example implementations of block 32 of FIG. 3, and it will be appreciated that the set of procedures performed may vary, based at least in part on the network infrastructure and protocols associated with the network and/or network access point associated with the network layer.

The apparatus also includes means, such as the processor 22, the memory 24, the communication interface 26 or the like for, while performing the set of procedures associated with the layer of the network, receiving an indication associated with the availability of services associated with a second network in a location associated with a mobile device. With reference to block 34 of FIG. 3, process 30 includes receiving an indication associated with the availability of services of a second network while performing the set of procedures. In many implementations of process 30, the first network may conform to an LTE standard, while the second network may conform to a 5G standard. However, example implementations may arise in contexts where the first and/or the second networks conform to different standards and/or where additional networks conforming any of a number of standards may be present. Moreover, the indication associated with the availability such services may take any of a number of forms depending, for example, on the protocols used to send the indication, the source of the indication, and/or the content of the indication. For example, the indication may take the form of a message and/or portion of a message transmitted over one or more functional layers of a cellular radio wireless network. With reference to FIG. 1, the indication may be sent by an access point, such as access point 12a and/or 12b, a WLAN access point 16, or another device associated with a system environment, such as system environment 100. In some example implementations, the indication is received from a public land mobile network (PLMN). While implementations of block 34 involve the receipt of the indication during the performance of procedures associated with a layer of a network, no precise sequencing with respect to the performance of such procedures is required. Rather, the indication may be received at any point in time during the performance the procedures associated with a layer of the network.

In some example implementations of block 34, the indication further includes an indication associated with a frame synchronization status of 5G services and LTE services available in the location associated with the mobile device. With reference to FIG. 1, user equipment 10 is shown as being in an area wherein it can communicate with access point 12a. In some example implementations, 5G services and LTE services may be available in a coverage area served by access point 12a. In some such implementations, the 5G services and the LTE services may be configured and implemented in such a way that frames associated with both services are synchronized. As discussed and contemplated elsewhere herein, the frame synchronization status of networks conforming to different network technology generations may enable the use of search requirements and/or protocols that facilitate the conservation of battery power that would otherwise be used by a mobile device and/or user equipment 10 to search for 5G service.

The apparatus also includes means, such as the processor 22, the memory 24, the communication interface 26 or the like for, based at least in part on receiving the indication associated with the availability of services associated with the second network in the location associated with the mobile device, generating a control signal causing a reconfiguration of the mobile device. As shown in block 36 in FIG. 3, process 30 includes generating a control signal causing a reconfiguration of the mobile device. In some examples, the apparatus, and other implementations of process 30, contemplate a mobile device being configured to operate in a manner that takes advantage of knowledge of whether 5G service is available in the area surrounding the mobile device. Particularly during the early deployment and implementation of 5G networks, mobile devices and other UE, such as UE 10 shown in FIG. 1, for example, may need to include components, circuitry, and other aspects that are designed to work with legacy networks alongside components, circuitry, and other aspects that are aimed at performing in a 5G environment. Moreover, continuous searching for a 5G network that has not yet been deployed in a particular area or is otherwise unavailable tends to cause excessive and unwanted battery consumption by the mobile device. As such, it is advantageous to cause a mobile device to be configured to use 5G services when the mobile device is located in an area where such services are available, and to be configured to not attempt to use 5G services when the mobile device is in an area where such services are not available.

Consequently, in some example implementations, the reconfiguration of the mobile device includes causing the mobile device to be configured to use 5G resources in a predetermined area. For example, with reference to FIG. 1, 5G services may be available in an area serviced by access point 12*a*. Consequently, upon receipt of an indication that 5G services might be available in that area, user equipment 10 may turn on or otherwise activate its 5G related components and, for example, search for and connect to 5G services. In some other example implementations, the reconfiguration of the mobile device comprises causing the mobile device to be configured to limit use of a battery associated with the mobile device when the mobile device is located outside of predetermined area. Such a reconfiguration may take any of a number of forms. For example, if the mobile device is in an area where 5G services are unavailable, the mobile device may be reconfigured such that components, circuitry, and/or other aspects of the mobile device that are solely and/or primarily used in connection with 5G services are deactivated. In some example implementations, the mobile device may be configured such that it limits and/or ceases the use of battery power to perform searches for 5G network services while the mobile device is located in an area where 5G services are not available and/or not known to be available. In addition to and/or as an alternative to these example implementations, other implementations that allow for limiting battery use and/or otherwise limiting power consumption may be used.

In some example implementations, the apparatus may also include means, such as the processor 22, the memory 24, the communication interface 26 or the like, for determining, based at least in part on the indication associated with the availability of services associated with the second network in the location associated with the mobile device, that 5G services are available in the location associated with the mobile device; and causing a modem associated with the mobile device to search for a 5G synchronization signal. It will be appreciated that, in some situations, the indication associated with the availability of the services associated with the second network in the location associated with the mobile device will indicate that 5G services are not available. However, in some situations, the indication will indicate that 5G services are and/or should be available in a particular area. As shown in block 38 of FIG. 3, for example, process 30 includes, optionally (as denoted by the dashed lines surrounding block 38), determining that 5G services are available in the location associated with the mobile device. In some implementations, such determining may be accomplished by processing, such as by the processor 22, the received indication. Upon determining that 5G services are available in the location associated with the mobile device, a modem associated with the mobile device can be activated, in response to a control signal, for example, to search for a 5G synchronization signal.

In some example implementations, it may be particularly advantageous to determine, based at least in part on an indication associated with the range of the LTE ID values detected for the LTE physical cell ID (PCI) or/and LTE global cell ID. Such a determination that either pre-determined range of IDs causes a search for 5G cells or alternatively a previously visited cell LTE Cell ID, with 5G cell availability detected, causes UE to activate the 5G search function. In some such implementations, potential power saving operation(s) on the 5G side can be dropped or reduced in order to rapidly find the 5G cell in the area. Alternatively, the presence of such LTE IDs that 5G has not been detected earlier may be used to cause the UE to use a power saving mode and search for 5G less frequently.

In some example implementations, the apparatus may also include means, such as the processor 22, the memory 24, the communication interface 26 or the like, for determining whether the mobile device has previously detected a 5G synchronization signal in the location associated with the mobile device and applying a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device. With reference to block 40 of FIG. 3, for example, process 30 includes, optionally (as denoted by the dashed lines surrounding block 40), determining whether the mobile device has previously detected a 5G synchronization signal in the location associated with the mobile device. In some example implementations, it may be advantageous to be able to ascertain whether the mobile device has actually previously detected a 5G synchronization signal in a particular area. For example, during the early stages of deployment of 5G networks, 5G services may become temporarily available and/or unavailable in a particular area, such that an indication regarding the likely availability of 5G services may not be accurate at a given moment in time.

Further, it may be particularly advantageous to adjust search criteria used by the mobile device to search for 5G service based on whether the mobile device has previously detected 5G synchronization signals in that particular area. For example, if a mobile device has not previously detected 5G signals in an area that is indicated to have 5G service, the use of additional search time may be warranted to locate and connect with the 5G service. Conversely, if the mobile device has previously detected 5G signals in an area, the use of less search time and/or other more restrictive requirements and/or protocols may be warranted to prevent wasting battery power in an area where 5G services may be temporarily offline or otherwise unavailable.

In some example implementations where the search criteria applied is based at least in part on a determination of whether the mobile device has previously detected a 5G synchronization signal in the location associated with the mobile device, applying a first set of search criteria or a second set of search criteria further comprises determining the frame synchronization status of 5G services and LTE services available in the location associated with the mobile device. For example, if the 5G services and the LTE services in a particular area are offered by different vendors and/or are otherwise frame synchronized, the use of additional search time and/or other more permissive criteria may be warranted to locate and connect to available 5G services. Conversely, if the 5G services and LTE services are supposed to be frame synchronized in a given location, the use of a shorter search time and/or other more restrictive search criteria may be warranted to avoid wasting battery power searching for 5G services that may not be available at a particular moment.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   performing a set of procedures associated with a layer of a first network;
   while performing the set of procedures associated with the layer of the first network, receiving an indication associated with the availability of services associated with a second network in a location associated with a mobile device; and
   based at least in part on receiving the indication associated with the availability of services associated with the second network in the location associated with the mobile device, generating a control signal causing a reconfiguration of the mobile device.

2. A method according to claim 1, wherein the first network conforms to a Long Term Evolution (LTE) standard and wherein the second network conforms to a fifth generation (5G) standard.

3. A method according to claim 1, wherein the layer of the network is a non-access stratum layer of the first network or an access stratum layer of the first network.

4. A method according to claim 1, wherein the indication associated with the availability of services associated with the second network in the location associated with the mobile device is received from a public land mobile network.

5. A method according to claim 1, wherein the reconfiguration of the mobile device comprises causing the mobile device to be configured to use 5G resources in a predetermined area.

6. A method according to claim 1, wherein the reconfiguration of the mobile device comprises causing the mobile device to be configured to limit use of a battery associated with the mobile device when the mobile device is located outside a predetermined area.

7. A method according to claim 1, further comprising:
   determining, based at least in part on the indication associated with the availability of services associated with the second network in the location associated with the mobile device, that 5G services are available in the location associated with the mobile device; and
   causing a modem associated with the mobile device to search for a 5G synchronization signal.

8. A method according to claim 1, wherein the indication further comprises an indication associated with a frame synchronization status of 5G services and LTE services available in the location associated with the mobile device.

9. A method according to claim 7, further comprising:
   determining whether the mobile device has previously detected a 5G synchronization signal in the location associated with the mobile device; and
   applying a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device.

10. A method according to claim 9, wherein applying a first set of search criteria or a second set of search criteria further comprises determining the frame synchronization status of 5G services and LTE services available in the location associated with the mobile device.

11. An apparatus comprising at least one processor and at least one memory storing computer program code, the at least one memory and the computer program code configured to, with the processor, cause the apparatus to at least:
   perform a set of procedures associated with a layer of a first network;
   while performing the set of procedures associated with the layer of the first network, receive an indication associated with the availability of services associated with a second network in a location associated with a mobile device; and based at least in part on receiving the indication associated with the availability of services associated with the second network in the location associated with the mobile device, generate a control signal causing a reconfiguration of the mobile device.

12. An apparatus according to claim 11, wherein the first network conforms to a Long Term Evolution (LTE) standard and wherein the second network conforms to a fifth generation (5G) standard.

13. An apparatus according to claim 11, wherein the layer of the network is a non-access stratum layer of the first network or an access stratum layer of the first network.

14. An apparatus according to claim 11, wherein the indication associated with the availability of services associated with the second network in the location associated with the mobile device is received from a public land mobile network.

15. An apparatus according to claim 11, wherein the reconfiguration of the mobile device comprises causing the mobile device to be configured to use 5G resources in a predetermined area.

16. An apparatus according to claim 11, wherein the reconfiguration of the mobile device comprises causing the mobile device to be configured to limit use of a battery associated with the mobile device when the mobile device is located outside a predetermined area.

17. An apparatus according to claim 11 wherein the at least one memory and the computer program code are further configured to, with the processor, cause the apparatus to at least:

determine, based at least in part on the indication associated with the availability of services associated with the second network in the location associated with the mobile device, that 5G services are available in the location associated with the mobile device; and cause a modem associated with the mobile device to search for a 5G synchronization signal.

18. An apparatus according to claim 11, wherein the indication further comprises an indication associated with a frame synchronization status of 5G services and LTE services available in the location associated with the mobile device.

19. An apparatus according to claim 17, wherein the at least one memory and the computer program code are further configured to, with the processor, cause the apparatus to at least:

determine whether the mobile device has previously detected a 5G synchronization signal in the location associated with the mobile device; and apply a first set of search criteria or a second set of search criteria, wherein applying the first set of search criteria is based at least in part on a determination that the mobile device has previously detected a 5G synchronization signal in the location associated with the mobile device and wherein applying the second set of search criteria is based at least in part on a determination that the mobile device has not previously detected a 5G synchronization signal in the location associated with the mobile device.

20. An apparatus according to claim 19, wherein applying a first set of search criteria or a second set of search criteria further comprises determining the frame synchronization status of 5G services and LTE services available in the location associated with the mobile device.

21. A computer program product comprising at least one non-transitory computer-readable storage medium having computer-executable program code instruction stored therein, the computer-executable program code instructions comprising program code instructions configured to:

perform a set of procedures associated with a layer of a first network;

while performing the set of procedures associated with the layer of the first network, receive an indication associated with the availability of services associated with a second network in a location associated with a mobile device; and based at least in part on receiving the indication associated with the availability of services associated with the second network in the location associated with the mobile device, generate a control signal causing a reconfiguration of the mobile device.

* * * * *